UNITED STATES PATENT OFFICE.

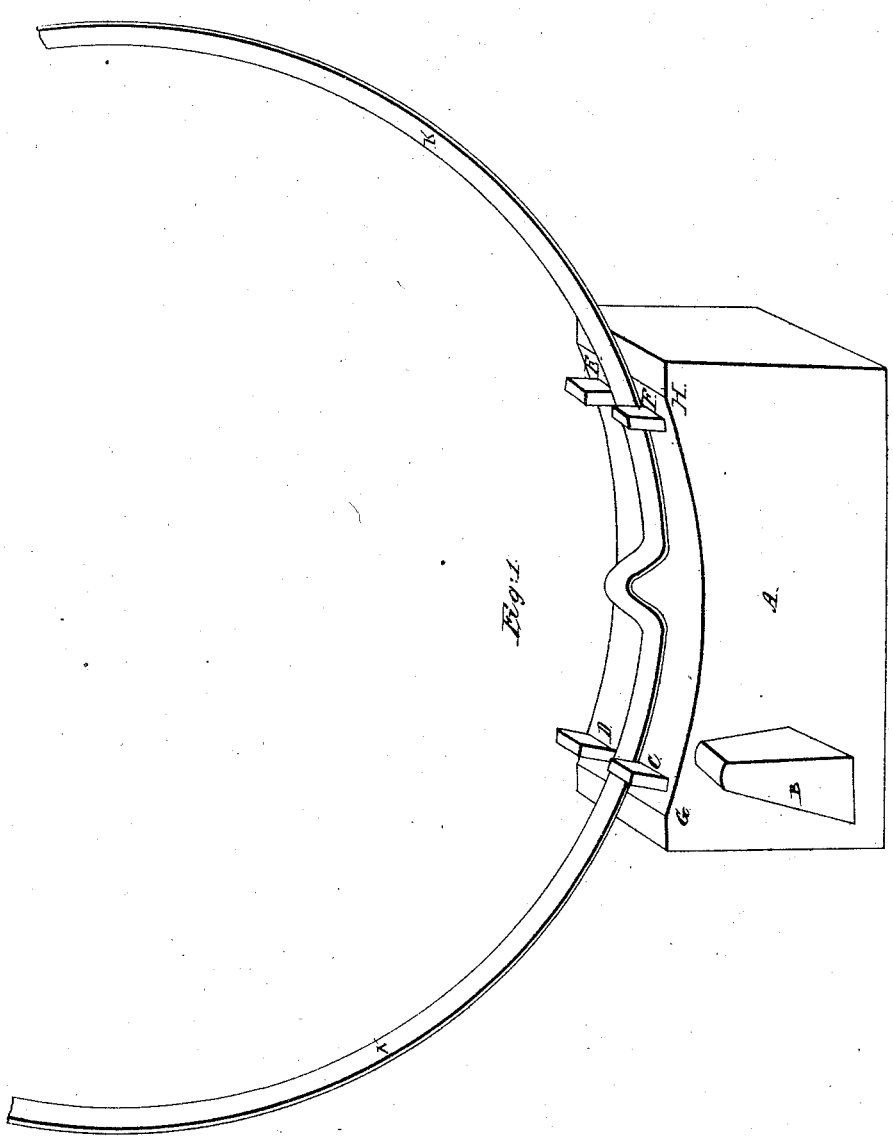

LEONARD KILE, OF WILLIAMSFIELD, OHIO.

UPSETTING TIRES.

Specification of Letters Patent No. 27,813, dated April 10, 1860.

*To all whom it may concern:*

Be it known that I, LEONARD KILE, of Williamsfield, Ohio, have invented a new and Improved Machine for Upsetting Wagon-Tires Without Cutting and Welding; and I do hereby declare that the following is a full and exact description of the same, reference being had to the accompanying drawings and the letters of reference marked thereon.

Figure 1 is a perspective view of my machine with all its parts adjusted in working order.

A is an anvil block of cast iron, with a horn, B, shaped like a letter U projecting from its side. The upper face of the anvil A is made concave from G, to H, as shown in the drawing.

C, D, E, F, are keys or wedges shaped like C, Fig. 2. These wedges or keys fit in corresponding holes in the anvil, A.

K, K, is a wagon tire placed on the anvil to be upset. Before placing it on the anvil A a short bend is made in it over the horn B, as shown at L, (the tire of course having been first heated). The keys C. D. E. F, being loosened the tire K, K, is placed between them. They are then driven down thereby firmly holding the tire between them. The operator now strikes on the crook or bend in the tire, L, and beats it down to correspond with the concave surface of the anvil, G, H, thereby "upsetting" or shortening the tire.

What I claim as my invention and desire to secure by Letters Patent is—

The employment of the wedges C, D, E, F, in combination with the concave faced anvil A, as and for the purpose herein shown and described.

LEONARD KILE.

Witnesses:
A. B. RICHMOND,
S. S. LANTZ.